April 4, 1950     O. A. SHORT     2,502,758
GLASS DECORATION
Filed Oct. 18, 1946
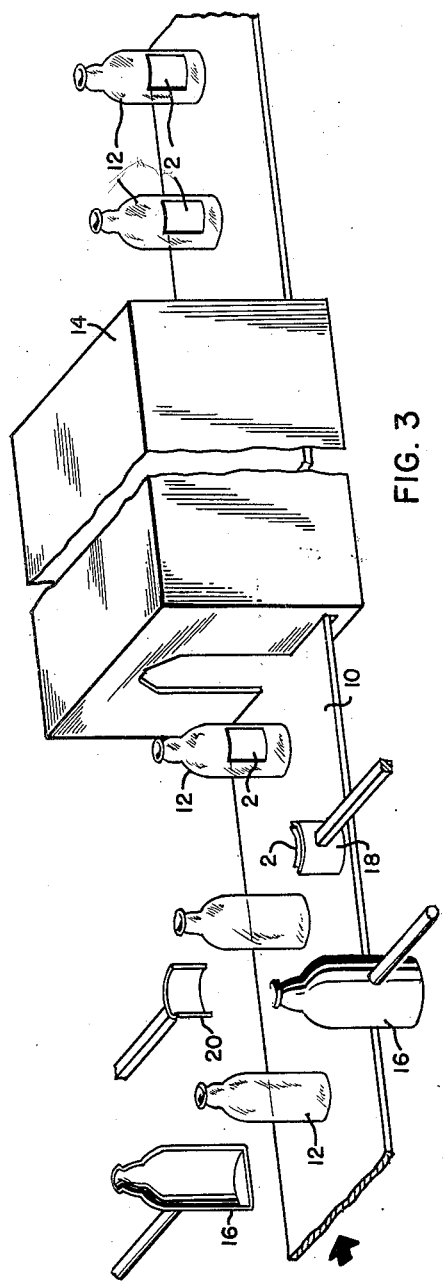
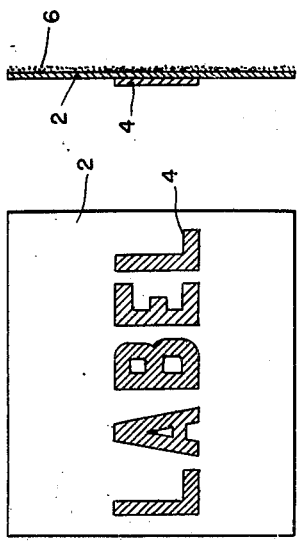
Oliver Alton Short
INVENTOR.
BY
ATTORNEY Patented Apr. 4, 1950

2,502,758

UNITED STATES PATENT OFFICE 2,502,758

GLASS DECORATION

Oliver Alton Short, New York, N. Y., assignor to E. I. du Pont de Nemours & Company, Wilmington, Del., a corporation of Delaware Application October 18, 1946, Serial No. 704,293

4 Claims. (Cl. 49—77)

This invention relates to glass decoration and, more particularly, it relates to the application of ceramic colors to glass articles.

It has long been known to apply a desired indicium or design in ceramic colors comprising mineral pigments and glass fluxes to glass articles, notably glass bottles. Such ceramic colors have been applied to glass articles by means of a silk screen stencil squeegee process or by means of a decalcomania or a pre-formed ceramic color label comprising a self-sustaining, heat-decomposable, plastic film upon which the design in ceramic colors has been applied. Such preformed ceramic color labels may be provided with a water-soluble adhesive which can be wet in a labeling machine and pasted onto the glass article. After application of the label, it is dried and then fired to fuse the ceramic colors into or onto the glass. Consequently, these previously known color labels must be applied to a glass article which has first been cooled to substantially room temperature.

Glass bottles and certain other glass articles which are produced in large quantities are usually produced by forming the same in a glass-forming mold. Glass articles, when produced in this manner, in order to prevent the setting-up therein of undue strains, are passed from the forming mold through an annealing lehr. When such glass articles are decorated with ceramic colors by known processes it is, therefore, necessary to first form the articles in a forming mold; second, anneal in an annealing lehr to gradually cool the same; third, apply the ceramic colors to the relatively cold articles; fourth, dry the label and fire to fuse the ceramic color; fifth, again anneal in an annealing lehr to gradually cool the same.

Many attempts have been made to apply the ceramic colors while the glass article is still hot from the forming mold to eliminate certain costly and time-consuming operations. Such previous attempts have not been entirely satisfactory.

It is an object of this invention to provide a pre-formed ceramic color label which may be applied to a hot glass article as the latter comes from a glass-forming mold and the ceramic color fused on or in the glass during the subsequent annealing operation.

It is another object of this invention to provide a process for the decoration with ceramic colors of glass articles formed in a glass-forming mold, which process will avoid the necessity of subjecting the articles to two annealing operations.

Other objects of the invention will appear hereinafter.

The objects of this invention may be accomplished, in general, by making a pre-formed ceramic color label comprising a self-sustaining, plastic film that will decompose without leaving a visible residue during the subsequent fusing of the ceramic colors, said film containing on one side thereof the ceramic colors in the desired design and containing on the other side thereof a coating of a glass flux having a very low fusing temperature.

Such a label can be applied to a hot bottle or the like as it comes from the forming mold with the side of the label containing the low melting flux in direct contact with the hot glass, and the bottle passed directly into the annealing lehr where the plastic film is decomposed and the ceramic colors are fused into the glass, and the glass cooled to a temperature at which strains are no longer set up therein. The low-melting flux is quickly softened or fused upon contact with the hot bottle to bond the label to the bottle, and no further means are necessary to hold the label to the bottle during the fusing of the ceramic colors.

The invention will be described with reference to the accompanying illustration, in which:

Fig. 1 is a plan view of the ceramic color label of the present invention.

Fig. 2 is a cross-sectional view of the color label of Fig. 1.

Fig. 3 is a diagrammatic perspective view of a label process comprising the movement of the bottle into and through an annealing lehr.

Figs. 1 and 2 of the drawings show a ceramic color label in which reference numeral 2 designates a self-supporting film of an organic plastic material which will decompose at the temperature of the fusing of ceramic colors. This film may contain a glass enamel dispersed therein which also will fuse to a glass object when the label is applied to such object having a temperature exceeding the fusing temperature of the enamel. A design 4 in ceramic colors of any desired configuration is positioned on one side of the film 2, and a finely divided glass flux or enamel 6 is positioned on the opposite side of the film 2.

Referring to Fig. 3 of the drawings, reference numeral 10 designates a transporting means for moving a succession of bottles 12 through an annealing lehr. The bottles 12 will have substantially the temperature at which they are removed from the forming moulds 16. The forming mould 16, in two halves, is shown being removed from the first bottle preparatory to application of a ceramic color label on the hot bottle. The bottle, as it moves to the annealing lehr 14, will have a temperature of between about 630° C. and the fusing temperature of the glass bottle. The label 2 is applied to the hot bottle with hand tongs or any other desired tool. As shown, the label is positioned on the inside of a fixture 18 having a curvature of the approximate shape of the bottle. The fixture and label may be moved by hand to place the label in contact with the bottle. A similar fixture 20 may be provided to steady the bottle 12 as the color label is applied thereto. After application of the label 2 to the bottle, the latter is moved through the annealing lehr 14 to cool the same in a conventional manner.

The self-supporting film of the ceramic color label may be made by casting a plastic film-forming dope comprising a film-forming material dissolved in a volatile solvent on a smooth, rigid, casting surface, for example, a glass surface or a polished metal surface. If desired, an anti-sticking agent, or so-called stripping agent, can first be applied to the casting surface. For example, dilorol phosphate, a sulfated higher alcohol, or the like, may be used for this purpose. The process of casting the self-supporting film of plastic material is a well-known process and is no part of the present invention. The self-supporting film may be made from any plastic material that will decompose by the heat of fusing the ceramic colors without leaving an unsightly residue. For example, nitrocellulose, cellulose acetate, plastic resins, and the like, have heretofore been used for this purpose. Particularly desirable results have been obtained by the use of alkyl methacrylate polymers for the self-supporting film of the label. For example, methyl methacrylate polymer and normal butyl methacrylate polymer having a molecular weight of the order of 15,000 to 50,000 have been found to produce superior color labels. The alkyl methacrylate polymers appear to have certain unique characteristics which avoid any possibility of disruption or distortion of the ceramic color designs during firing. Ceramic color labels made with these materials as the self-supporting films are, therefore, preferred. The casting dope from which the self-supporting film is cast preferably contains an opacifying agent which will fuse during the fusing of the ceramic colors to produce a white or colored opaque background for the ceramic color design. Numerous possible opacifying agents which may be used for this purpose are known in the arts, for example, oxides of titanium, zirconium, tin, and antimony are known opacifying agents. The opacifying agent may be mixed with a white glass enamel and the mixture incorporated in the film-forming casting dope in the manner disclosed in the example below.

After the self-supporting film has been cast and thoroughly dried, the desired design in ceramic colors is applied to one surface of the film. This may be done by printing, squeegee application, hand application, or in any other known manner. The design may be applied in a single ceramic color or in a number of colors, as desired. Ceramic colors composed of mineral pigments and glass flux or frit are well known in the arts.

After the application of the ceramic color design to the self-supporting film, and stripping of the film from the forming surface, a coating of a low-melting glass flux is applied to the side of the film opposite the color design. The glass flux must have a low softening or fusing temperature, i. e., it must fuse at a temperature below about 600° C. so that upon placing the label against the hot bottle having a temperature exceeding about 630° C., with the glass flux-containing side against the bottle, the flux will immediately soften to bond the label to the bottle. Any glass flux having a fusing temperature of about 600° C. or less is suitable for this purpose. A glass flux having the following composition is particularly desirable for use as a coating on the film as above described.

*Glass flux*

| | Per cent |
|---|---|
| PbO | 60.0 |
| $SiO_2$ | 22.9 |
| $B_2O_3$ | 7.8 |
| $TiO_2$ | 5.5 |
| CdO | 3.8 |
| | 100.0 |

The glass flux may be applied to the self-supporting film in any desired manner. For example, it may comprise a dry, powdered layer on the casting surface before the film-forming dope is cast thereon to form the film. The particles of the flux will be sufficiently embedded in the film to permit unusual handling of the labels. The glass flux may be applied to the film by merely forming a slurry thereof in finely divided form in water, said slurry contaning, for example, 100 to 200 grams of flux to about 60 cc. of water. This slurry can be applied by spraying, brushing, or any other manner, and the water evaporated. The fine, loose powder of flux thereby remaining as a coating is sufficient to accomplish the bonding of the label to the hot glassware as above set forth. If desired, the glass flux may be mixed with a binder composed of a plastic material, for example, nitrocellulose, an alkyl methacrylate polymer, a resin, or the like, with sufficient solvent to produce a slurry and applied to the film in this form. An alternative method of employing the soft flux in a binder slurry consists of casting said slurry on the forming surface. When this is dry the label film is cast over the binder film, the ceramic color decoration applied, and the entire label stripped from the forming surface.

The following example is given to illustrate, in detail, a preferred ceramic color label made in accordance with the present invention and a preferred procedure of applying the same to a hot bottle. The details of this example are not to be considered as limiting the invention thereto.

*Example*

A ceramic color label comprising a self-sustaining film of methyl methacrylate polymer having a molecular weight of about 25,000, a design in ceramic colors on one side thereof, and a coating of glass flux having a fusing temperature of 585° C. on the other side thereof, is prepared by first casting a solution of said methyl methacrylate polymer dope containing the following ingredients on a smooth, glass casting surface.

12.6 grams methyl methacrylate polymer, molecular weight about 25,000
57.4 grams methyl ethyl ketone
85.0 grams 50–50 (by weight) butanol-xylene mixture
2.0 grams dibutyl phthalate
100.0 grams white glass enamel having the following composition:

| | Per cent |
|---|---|
| PbO | 52.00 |
| $B_2O_3$ | 6.15 |
| $SiO_2$ | 31.00 |
| $TiO_2$ | 0.95 |
| $ZrO_2$ | 3.65 |
| ZnO | 1.98 |
| $Na_2O$ | 4.27 |
| | 100.00 |

The cast film is dried and there is applied thereon a design in ceramic colors by squeegeeing the colors thereon through a silk or metal screen stencil. The film is then removed from the casting surface and coated on the opposite side with a water slurry of a 200-mesh glass flux having the composition

| | Per cent |
|---|---|
| PbO | 60.0 |
| $SiO_2$ | 22.9 |
| $B_2O_3$ | 7.8 |
| $TiO_2$ | 5.5 |
| CdO | 3.8 |
| | 100.0 |

The water slurry contained 180 grams flux to 65 cc. of water. The water is then evaporated from the coated film.

The above-described label is applied to a hot glass article such as a bottle by first holding it momentarily, one or two seconds, against the hot bottle, as it comes from the glass-forming mold, and having a temperature of about 640° C., the label being applied with the glass flux-containing side against the glass. The label firmly adheres to the bottle and the latter is immediately passed into an annealing lehr having an entrance temperature approximately the same as the temperature of the bottle coming from the forming mold (about 640° C.). The organic ingredients of the label volatilize while the ceramic colors fuse into the glass of the bottle to form a permanent design on the bottle during the passage of the latter through the annealing lehr.

Reference in the specification and claims to parts, proportions and percentages, unless otherwise specified, refers to parts, proportions and percentages by weight.

Since it is obvious that many changes and modifications can be made in the above-described details without departing from the nature and spirit of the invention, it is to be understood that the invention is not to be limited to said details except as set forth in the appended claims.

What is claimed is:

1. The process of applying a ceramic color design on a glass article which comprises positioning on said glass article as it comes from a glass-forming operation, fully solidified but at a temperature exceeding about 630° C., a ceramic color label comprising a self-supporting film of an organic plastic material that will decompose by the heat of fusing of ceramic colors, said film containing on one side thereof a design in ceramic color and on the other side thereof a finely divided glass flux having a fusing temperature not to exceed 600° C., said label being applied with said glass flux-containing side in contact with said hot glass article whereby said flux immediately fuses to adhere the label to said article, and cooling said article in an annealing lehr.

2. The process of applying a ceramic color design on a glass article which comprises positioning on said glass article as it comes from a glass-forming operation fully solidified but at a temperature exceeding about 630° C., a ceramic color label comprising a self-supporting film of an alkyl methacrylate polymer containing on one side thereof a design in ceramic colors and on the other side thereof a finely divided glass flux having a fusing temperature not to exceed 600° C., said label being applied with said glass flux-containing side in contact with said hot glass article whereby said flux immediately fuses to adhere the label to said article, and cooling said article in an annealing lehr.

3. The process as defined in claim 2 in which said alkyl methacrylate polymer is methyl methacrylate polymer.

4. The process as defined in claim 2 in which said alkyl methacrylate polymer is normal butyl methacyrate polymer.

OLIVER ALTON SHORT.

REFERENCES CITED

The following references are of record in the file of this patent:

UNITED STATES PATENTS

| Number | Name | Date |
|---|---|---|
| 1,658,015 | Carpenter et al. | Jan. 31, 1928 |
| 1,725,199 | Kuhn et al. | Aug. 20, 1929 |
| 2,311,876 | Scheetz | Feb. 23, 1943 |
| 2,322,310 | Muskat et al. | June 22, 1943 |
| 2,419,918 | Scheetz | Apr. 29, 1947 |
| 2,431,873 | Kennelly | Dec. 2, 1947 |